United States Patent
Gao et al.

(10) Patent No.: US 7,172,988 B2
(45) Date of Patent: Feb. 6, 2007

(54) CATALYST COMPONENT FOR ETHYLENE POLYMERIZATION, A PROCESS FOR PREPARING THEREOF AND CATALYST COMPRISING THE SAME

(75) Inventors: Kejing Gao, Beijing (CN); Dongbing Liu, Beijing (CN); Wei Chen, Beijing (CN); Guirong Fan, Beijing (CN); Xinping Lu, Beijing (CN); Jingyan An, Beijing (CN); Ying Guan, Beijing (CN); Jun Zhang, Beijing (CN); Qinfang Zhao, Beijing (CN)

(73) Assignees: China Petroleum & Chemical Corporation, Beijing (CH); Beijing Research Institute of Chemical Industry, Beijing (CN)

( * ) Notice: Subject to any disclaimer, the term of this patent is extended or adjusted under 35 U.S.C. 154(b) by 69 days.

(21) Appl. No.: 10/686,029

(22) Filed: Oct. 15, 2003

(65) Prior Publication Data
US 2004/0127349 A1    Jul. 1, 2004

(30) Foreign Application Priority Data
Oct. 16, 2002    (CN) ............................... 02 1 31464

(51) Int. Cl.
*B01J 31/00* (2006.01)
*B01J 37/00* (2006.01)
*C08F 4/02* (2006.01)
*C08F 4/60* (2006.01)
*C08F 4/44* (2006.01)

(52) U.S. Cl. ............ 502/128; 502/119; 502/125; 502/129; 502/132; 502/133; 526/112; 526/129; 526/143; 526/144; 526/151

(58) Field of Classification Search ............ 502/125, 502/128, 129, 119, 132, 133; 526/112, 129, 526/143, 144, 151
See application file for complete search history.

(56) References Cited

U.S. PATENT DOCUMENTS

| 3,787,384 | A |   | 1/1974  | Stevens et al. |
|-----------|---|---|---------|-----------------|
| 4,148,754 | A |   | 4/1979  | Strobel et al. |
| 4,173,547 | A |   | 11/1979 | Graff |
| 4,301,029 | A |   | 11/1981 | Caunt et al. |
| 4,508,843 | A |   | 4/1985  | Etherton et al. |
| 4,535,068 | A | * | 8/1985  | Job ............ 502/107 |
| 4,558,025 | A | * | 12/1985 | Best ............ 502/115 |
| 4,564,606 | A | * | 1/1986  | Best ............ 502/117 |
| 4,727,049 | A | * | 2/1988  | Furuhashi et al. ......... 502/115 |
| 4,921,920 | A |   | 5/1990  | Collomb-Ceccarini et al. |
| 4,954,470 | A | * | 9/1990  | Nowlin et al. ............ 502/107 |
| 5,124,296 | A |   | 6/1992  | Chamla et al. |
| 5,281,567 | A | * | 1/1994  | Job ............ 502/120 |
| 5,633,419 | A |   | 5/1997  | Spencer et al. |
| 2001/0016633 | A1 | * | 8/2001 | Fujiwara et al. ........... 526/119 |

FOREIGN PATENT DOCUMENTS

EP    0 688 794    12/1995
WO    99/51649    10/1999

* cited by examiner

Primary Examiner—J. A. Lorengo
Assistant Examiner—J. Pasterczyk
(74) Attorney, Agent, or Firm—Ladas and Parry LLP

(57) ABSTRACT

A catalyst component for ethylene polymerization, including an inorganic oxide support, and at least one alkyl metal compound, at least one halide, at least one dihydrocarbyl magnesium compound, at least one difunctional compound that reacts with the dihydrocarbyl magnesium compound and at least one titanium compound, wherein the difunctional compound is a mono-, di- or multi-halogenated alcohol or phenol having from 2 to 20 carbon atoms; or a mono-, di- or multi-halogenated acyl halide having from 2 to 20 carbon atoms. Also, a process for preparing the catalyst component and use thereof.

22 Claims, No Drawings

CATALYST COMPONENT FOR ETHYLENE POLYMERIZATION, A PROCESS FOR PREPARING THEREOF AND CATALYST COMPRISING THE SAME

CROSS REFERENCE OF RELATED APPLICATION

The present application claims priority CN 02131464.0, filed on Oct. 16, 2003, which is incorporated herein by reference in its entirety and for all purposes.

TECHNICAL FIELD

The present invention relates to a catalyst component for olefin polymerization, in particular, ethylene polymerization, to a process for preparing thereof, to a catalyst comprising the same, and to a process for ethylene polymerization.

BACKGROUND ART

Since the successful development of high activity polyethylene catalyst at 1970s, the whole polyethylene industry in the world has changed greatly. In recent three decades, with the development of ethylene polymerization processes, catalysts assorting to the polymerization processes have gotten significant progress, and high activity catalysts have been playing an important role in the field of polyethylene catalyst because of their excellent polymerization performance and mature application technology. Through many years of research, the preparation process of Mg—Ti-based high activity catalysts has developed to chemical reaction process from co-grinding process and suspension-impregnation process. Among the chemical reaction processes, many patents, for example, EP 688794(CN1158136) and U.S. Pat. Nos. 3,787,384; 4,148,754; 4,173,547; 4,301,029; 4,508,843; 4,921,920 and 5,124,296, direct to catalysts obtained by supporting the reaction product, as active component, of a dihydrocarbyl magnesium, a chlorinating agent and a transition metal halide etc. onto a spheric inorganic oxide support. The recent development on this type of Mg—Ti-based catalyst is introduction of electron donor compound (for example aliphatic alcohol compounds) during the preparation of the catalyst composition. Experiments show that the introduction of the electron donor compound improves polymerization activity and hydrogen response of the catalyst.

For example, EP688794 discloses use of a long chain aliphatic alcohol compound having α-branch chain during the preparation of the catalyst composition, and polymerization activity and hydrogen response of the catalyst are improved by introducing said compound. In particular, said catalyst retains high polymerization activity under different hydrogen partial pressures for preparing ethylene homopolymer and copolymer having low and high molecular weight, namely, the balance of the activity of the catalyst is good. However, the inventors have now found that such catalyst solid component powders carry a great amount of static charges, so that an anti-static agent must be added in the polymerization process, thus operation is discommodious and cost increases. While without limited to any specific theory, the inventors believe after repeated experiments that the addition of alkyl metal chloride compound in the preparation of the catalyst is a main reason resulting in that the catalyst solid component powders carry a great amount of static charges.

After repeated experiments, the inventors have now found that a catalyst solid component prepared by using an alkyl metal compound in combination with a difunctional compound having a specific structure and a halide rather than alkyl metal chloride compound solves the problem that catalyst solid component powders carry too great amount of static charges, and the catalyst powders exhibit excellent flowability, good hydrogen response and co-polymerization performance, and high polymerization activity.

SUMMARY OF THE INVENTION

One of the object of the invention is to provide a catalyst component for ethylene polymerization, comprising an inorganic oxide support, and at least one alkyl metal compound, at least one halide, at least one dihydrocarbyl magnesium compound, at least one difuntional compound that reacts with the dihydrocarbyl magnesium compound and at least one-titanium compound, which are supported on the support, wherein (1) the alkyl metal compound is represented by formula (I):

$$\text{MeR}^1\text{R}^2\text{R}^3 \qquad (I)$$

wherein $R^1$, $R^2$ and $R^3$, which may be identical or different, are $C_1$–$C_{20}$ alkyl, Me is an element of IIIA group of the Periodic Table;

(2) the halide is a compound represented by formula (II) $MX_n$, in which M is an element of IIIA, IVA, VA, IIIB, IVB or Vb groups of the Periodic Table, X is F, Cl or Br, and n=3, 4 or 5, or a $C_1$–$C_{20}$ alkyl halide; and (3) the difunctional compound is a mono-, di- or multi-halogenated alcohol or phenol having from 2 to 20 carbon atoms; or a mono-, di- or multi-halogenated acid halide having from 2 to 20 carbon atoms.

Another object of the invention is to provide a process for the preparation of the catalyst component for ethylene polymerization according to the present invention, comprising the steps of:

(1) contacting an inorganic oxide support with an alkyl metal compound having formula:

$$\text{MeR}^1\text{R}^2\text{R}^3 \qquad (I)$$

in which $R^1$, $R^2$ and $R^3$, which may be identical or different, are $C_1$–$C_{20}$ alkyl, Me is an element of IIIA group of the Periodic Table, to obtain a treated inorganic oxide support;

(2) contacting the treated inorganic oxide support obtained from the step (1) with a dihydrocarbyl magnesium compound;

(3) contacting the product obtained from the step (2) with a difunctional compound, which is a mono-, di- or multi-halogenated alcohol or phenol having from 2 to 20 carbon atoms, or a mono-, di- or multi-halogenated acid halide having from 2 to 20 carbon atoms;

(4) contacting the product obtained from the step (3) with a halide, which is a compound represented by formula (II) $MX_n$, in which M is an element of IIIA, IVA, VA, IIIB, IVB or VB groups of the Periodic Table, X is F, Cl or Br, and n=3, 4 or 5, or a $C_1$–$C_{20}$ alkyl halide; and (5) contacting the product obtained from the step (4) with a titanium compound to obtain a catalyst component.

Yet another object of the invention is to provide a catalyst for ethylene polymerization, comprising:

(a) the catalyst component for ethylene polymerization according to the present invention; and (b) at least one organoaluminium compound of formula $AlR_nX_{3-n}$, wherein R are independently each other hydrogen or hydrocarbyl having from 1 to 20 carbon atoms, X are independently each other halogen, and n is a value meeting the condition of $1 < n \leq 3$.

Yet still another object of the invention is to provide a process for ethylene polymerization, comprising the step of contacting ethylene and optional comonomer(s) with the catalyst for ethylene polymerization according to the present invention under polymerization conditions.

DETAILED DESCRIPTION OF THE INVENTION

In the first aspect, the invention provides a catalyst component for ethylene polymerization, comprising an inorganic oxide support, and at least one alkyl metal compound, at least one halide, at least one dihydrocarbyl magnesium compound, at least one difuntional compound that reacts with the dihydrocarbyl magnesium compound and at least one titanium compound, which are supported on the support. The catalyst component for ethylene polymerization according to the present invention is sometimes called as catalyst solid component hereafter.

The alkyl metal compound is represented by the following formula (I):

$$MeR^1R^2R^3 \qquad (I)$$

in which $R^1$, $R^2$ and $R^3$, which may be identical or different, are $C_1$–$C_{20}$ alkyl, and Me is an element of IIIA group of the Periodic Table, preferably aluminium Examples of suitable alkyl metal compounds useful in the present invention include, but not limited to, triethyl aluminium, tripropyl aluminium, tri-iso-butyl aluminium, and tri-n-hexyl aluminium. Among them, the preferred is alkyl aluminium compound having long carbon chain, such as, tri-n-hexyl aluminium and the like, The term "alkyl" as used herein includes linear, branched and cyclic alkyl. Unless clearly otherwise indicated, the term "hydrocarbyl" as used herein includes aliphatic, alicylic and aromatic hydrocarbyl, and the aliphatic hydrocarbyl includes linear and branched aliphatic hydrocarbyl.

The halide useful in the present invention is a compound represented by formula (II) $MX_n$, in which M is an element of IIIA, IVA, VA, IIIB, IVB or VB groups of the Periodic Table, X is F, Cl or Br, and n=3, 4 or 5, or a $C_1$–$C_{20}$ alkyl halide. Examples include, but not limited to, $AlCl_3$, $BCl_3$, $SiCl_4$, $TiCl_4$, $NdCl_2$, $CCl_4$, $CH_3CH_2CH_2CH_2Cl$, and $(CH_3)_3CCl$.

The difunctional compound is a mono-, di- or multi-halogenated alcohol or phenol having from 2 to 20 carbon atoms, or a mono-, di- or multi-halogenated acid halide having from 2 to 20 carbon atoms. Examples include, but not limited to, $Cl_3CCH_2OH$, $Cl_2CHCH_2OH$, $ClCH_2CH_2OH$, $Cl_3CC(CH_3)_2OH$, $ClCH_2CH_2CH_2CH_2OH$, 2-chloro-cyclohexanol, o-chlorophenol, m-chlorophenol, p-chlorophenol, $Cl_3CCOCl$, $Cl_2CHCOCl$, $ClCH_2COCl$ and o-chlorobenzoyl chloride.

The dihydrocarbyl magnesium compound is represented by formula (IV):

$$MgR^6R^7 \qquad (IV)$$

in which $R^6$ and $R^7$, which may be identical or different are $C_2$–$C_{20}$ hydrocarbyl. The dihydrocarbyl magnesium compound useful in the present invention is preferably dibutyl magnesium, butyl ethyl magnesium or butyl octyl magnesium and the like.

The titanium compound is represented by formula (V)

$$Ti(OR^8)_{4-m}X_m \qquad (V)$$

in which $R^8$ is a $C_1$–$C_{14}$ linear or branched aliphatic hydrocarbyl, X is selected from the group consisting of F, Cl, Br, and mixture thereof, and m is an integer of from 1 to 4. Examples of suitable titanium compound useful in the present invention include, but not limited to, titanium tetrachloride, titanium tetrabromide, titanium tetraiodide, tetrabutyl titanate, tetraethyl titanate, triethoxy titanium chloride, diethoxy titanium dicloride, ethoxy titanium trichloride, titanium trichloride, and mixture thereof. The preferred is titanium tetrachloride, The titanium compound is preferably miscible in an apolar solvent at the application temperature.

The inorganic oxide support useful in the present invention is well known in the art and mainly used to support active component. In principle, any inorganic oxide support that does not interfere desired chemical conversion reaction is suitable. Examples of such inorganic oxide supports include, but not limited to, silica, alumina, silica-alumina, magnesia, titania, chromia, zirconia, and the like, among them, silica is preferred. In general, the inorganic oxide supports should be used in spheric or ellipsoidal form in dry state. Typically, the particles of the support have an average particle size of from about 1 micron to about 250 microns, preferably from about 10 microns to about 100 microns, a specific surface area of from 100 to 800 $m^2/g$, and a pore volume of from 1 to 8 cc/g. Drying said inorganic oxide support can be performed at a temperature of from 100 to 1000° C., preferably from 200 to 900° C., more preferably from about 400 to 600° C. When silica is used as the inorganic oxide support, it is generally drying treated at a temperature of from 200 to 1000° C., preferably from 200 to 850° C., more preferably from 400 to 600° C. prior to be used. The drying treatment can be performed for from about 0.5 to 24 hours, preferably from about 1 to 10 hours.

In the second aspect, the invention provides a process for the preparation of the catalyst component for ethylene polymerization according to the present invention, comprising preferably the steps of:

(1) contacting the inorganic oxide support with the alkyl metal compound of formula (I) to obtain a treated inorganic oxide support;

(2) contacting the treated inorganic oxide support obtained from the step (1) with the dihydrocarbyl magnesium compound;

(3) contacting the product obtained from the step (2) with the difunctional compound;

(4) contacting the product obtained from the step (3) with the halide; and (5) contacting the product obtained from the step (4) with the titanium compound to obtain a catalyst component.

In the process for the preparation of the catalyst component for ethylene polymerization according to the present invention, the order of the above steps (2), (3) and (4) can be changed For instance, in another embodiment of the present invention, the process for the preparation of the catalyst component for ethylene polymerization according to the present invention comprises the steps of:

(1) contacting the inorganic oxide support with the alkyl metal compound of formula (I) to obtain a treated inorganic oxide support;

(2) contacting the treated inorganic oxide support obtained from the step (1) with the halide;

(3) contacting the product obtained from the step (2) with the difunctional compound;

(4) contacting the product obtained from the step (3) with the dihydrocarbyl magnesium compound; and (5) contacting the product obtained from the step (4) with the titanium compound to obtain a catalyst component In the process for the preparation of the catalyst component according to the present invention, amount of the alkyl metal compound used is from 0.1 to 5.0 mmol, preferably from 0.3 to 1.5 mmol; amount of the halide used is from 0.1 to 5.0 mmol, preferably from 0.3 to 1.2 mmol; amount of the difunctional compound used is from 0.2 to 10 mmol, preferably from 0.5 to 3.0 mmol; amount of dihydrocarbyl magnesium compound used is from 0.25 to 5.0 mmol, preferably from 0.5 to 3.0 mmol; and amount of the titanium compound used is from 0.1 to 5.0 mmol, preferably from 0.5 to 2.0 mmol, with respect to 1 gram of the inorganic oxide suport; and wherein the molar ratio of the difunctional compound to the dihydrocarbyl magnesium compound is controlled to a range of 0.8 to 2.5, preferably 0.9 to 2.2.

The preparation of the catalyst component according to the present invention is preferably carried out in an apolar inert solvent. The amount of solvent used to form slurry can vary within a broad range, In general, as desired, the amount of the solvent is in the range of from about 5 ml/g support to about 200 ml/g support. The preferable apolar solvent is alkane, such as, pentane, isopentane, bexane, heptane, octane, nonane, and decane. Prior to use, the liquid medium used in the process according to the present invention is preferably purified by, for example, removing trace amount of water, oxygen, polar compounds and any other substances that may adversely effect the polymerization activity of the catalyst through treatment using silica or molecule sieve.

It has been found that slower reaction process aids to obtain a catalyst component having better particle morphology. Therefore, lower reaction temperature is preferable. The reaction in the present process is typically carried out at a temperature of from about 5 to 80° C., preferably from 20 to 60° C. The reaction time can also vary within a broad range, and it is generally in the range of from 0.5 to 10 hours. It can be appreciated that the individual components should be allowed to react each other at desired reaction temperature for enough long period.

In the third aspect, the present invention provides a catalyst for ethylene polymerization, comprising:

(a) the catalyst component for ethylene polymerization according to the present invention; and (b) at least one organoaluminium compound of formula $AlR_nX_{3-n}$, wherein R are independently each other hydrogen or hydrocarbyl having from 1 to 20 carbon atoms, X are independently each other halogen, and n is a value meeting the condition of $1 < n \leq 3$.

The organoaluminium compound used as co-catalyst is well known in the art, and is preferably $AlEt_3$, $Al(iso-Bu)_3$, $Al(n-C_6H_{13})_3$, $Al(n-C_8H_{17})_3$, $AlEt_2Cl$, and mixture thereof. The contacting manner and ratio of amounts of the components (a) and (b) of the catalyst are also well known in the art.

In the fourth aspect, the invention provides a process for ethylene polymerization, comprising the step of contacting ethylene and optional comonomer(s) with the catalyst according to the present invention under polymerization conditions. The catalyst according to the present invention is suitable for any low pressure ethylene polymerization process for which supported Ziegler-Natta type of catalyst is applicable, such as, slurry process and gas phase process. These ethylene polymerization processes are well known in the art. Examples of α-olefins, which can be co-polymerized with ethylene, include, but not limited to, propylene, 1-butene, 1-pentene, 1-hexene, 1-octene, and 4-methyl-1-pentene.

It is worth to note that, if an alkyl metal chloride is employed in the process for the preparation of the catalyst, the catalyst solid component powders prepared carry a great amount of static charges. The present invention solves the problem that the catalyst solid component powders prepared carry a great amount of static charges by employing the alkyl metal compound and the halide in combination with the difunctional compound that reacts with the dihydrocarbyl magnesium to prepare the catalyst, and the catalyst solid component prepared similarly possesses excellent hydrogen response and copolymerization performance as well as high polymerization activity. Especially, the catalyst according to the present invention still has a higher polymerization activity when preparing a polymer having large melt flow index so that it is particularly suitable for the preparation of polyethylene having bimodel of molecular weight distribution.

Mode of Carrying Out the Invention

The following examples further describe the invention, but do not make limitation to the invention in any way.

Testing Methods:

1. Melt index: measured according to ASTM D1238-99.

2. Method for evaluating amount of static charges carried by catalyst solid component powders:

It is well known that the larger amount of static charges carried by solid powders, the more powders that are attached to well of a container. Therefore, the amount of static charges carried by the catalyst component powders can be indicated through measuring the amount of powders that are attached to well of a container.

In a glove box under nitrogen atmosphere, a well dried 80 ml glass ampoule (available from Beijing Glass Instrument Factory) was weighed. At ambient temperature, the ampoule was charged with 5 g of catalyst component powders, and then fastened to an oscillator (Oscillator AS200 BASIC Model, available from Retsch Corp., German). The ampoule was oscillated for 5 min with the amplitude being set at 80. Next, the ampoule was reversed to allow the catalyst component powders to flow out freely, and the ampoule was weighed again. Amount of the powders attached to the ampoule was calculated from the two weights and was used as a measurement of the amount of static charges carried by the catalyst component powders.

EXAMPLE 1

A catalyst solid component was prepared by the steps of:

(1) 12 g of spheric silica (948 Grade, available from Grace Company, USA) was activated at 600° C. under nitrogen atmosphere for 4 hours;

(2) Under nitrogen atmosphere, to a high temperature dried glass reactor equipped with a stirrer were successively charged with 5.0 g of heat activated silica obtained from step (1), 100 ml of purified hexane (which was dried over 3 angstroms molecular sieve and bubbled with nitrogen gas for about 2 hours to remove oxygen and moisture. The hexane used in the invention below was treaded in the same manner) and 2.0 ml of $Al(n-C_6H_{13})_3$ solution in hexane (1.5 mmol/ml). While stirring, the reaction mixture was allowed to react at 60° C. for 0.5 hour, then 0.6 ml of silicone tetrachloride was dropwise added thereto, and the reaction was continued for further 0.5 hour;

(3) While stirring and at 60° C., 1.9 ml of Cl₃CCH₂OH was added dropwise to the reactor, and after the reaction was allowed for further 1 hour, 10.0 ml of dibutyl magnesium solution in heptane (1M) was added dropwise, then the reaction was allowed for further 2 hours, next 0.6 ml of titanium tetrachloride was added dropwise, and the reaction was continued for another 1 hour;

(4) The reaction mixture was heated to 70° C. and dried by allowing high purification nitrogen gas passing through the reactor to obtain free flowing light brown solid powders.

The amount of static charges carried by the catalyst solid component powders was evaluated through above-mentioned method, and the result was shown in Table 1.

Evaluation of the Catalyst:

Ethylene slurry polymerization was carried out under different hydrogen gas partial pressures to prepare polyethylene having different melt index. Polymerization conditions: 2 L stainless steel autoclave with a stirrer, 1 L of hexane as solvent, 1.03 MPa of total pressure of polymerization, about 50 mg of catalyst solid component, 1 ml of triethyl aluminium solution in hexane (1M) as cocatalyst and scavenger, polymerization temperature: 85° C., polymerization time: 1 hour, and $P_{H2}/P_{C2H4}=0.28/0.75$ when polyethylene having low melt index was prepared, $P_{H2}/P_{C2H4}=0.60/0.43$ when polyethylene having high melt index was prepared, wherein $P_{H2}$ represents partial pressure of hydrogen gas, and $P_{C2H4}$ represents partial pressure of ethylene. The results of polymerization were shown in Table 1.

EXAMPLE 2

A catalyst solid component was prepared through a procedure similar to that described in Example 1, except that 2.0 ml of $Al(n-C_6H_{13})_3$ solution in hexane (1.5 mmol/ml) used in step (2) was replaced with 3.0 ml of $Al(C_2H_5)_3$ solution in hexane (1.0 mmol/ml).

The catalyst solid component was evaluated in slurry polymerization under the same polymerization conditions as that in Example 1, and the results of polymerization were shown in Table 1.

The amount of static charges carried by the catalyst solid component powders was evaluated through above-mentioned method, and the result was shown in Table 1.

EXAMPLE 3

A catalyst solid component was prepared through a procedure similar to that described in Example 1, except that silicone tetrachloride used in step (2) was replaced with titanium tetrachloride.

The catalyst solid component was evaluated in slurry polymerization under the same polymerization conditions as that in Example 1, and the results of polymerization were shown in Table 1.

The amount of static charges carried by the catalyst solid component powders was evaluated through above-mentioned method, and the result was shown in Table 1.

EXAMPLE 4

A catalyst solid component was prepared through a procedure similar to that described in Example 1, except that 0.6 ml of silicone tetrachloride used in step (2) was replaced with 0.3 ml of silicone tetrachloride.

The catalyst solid component was evaluated in slurry polymerization under the same polymerization conditions as that in Example 1, and the results of polymerization were shown in Table 1.

The amount of static charges carried by the catalyst solid component powders was evaluated through above-mentioned method, and the result was shown in Table 1.

COMPARATIVE EXAMPLE 1

A catalyst solid component was prepared by the steps of:
(1) To a reactor were successively charged with 200 ml of hexane, 2.0 ml of toluene and 10 mmol of butyl octyl magnesium solution (1M), and 2.8 ml of 2-ethyl-1-hexanol was added dropwise and slowly thereto while the reaction temperature was maintained below 40° C., to obtain an alcohol-magnesium complex;

(2) At 25° C., to 5.0 g of silica (activated at 600' for 4 hours) was added 100 ml of hexane, then 5.0 ml of ethyl aluminium dichloride solution in hexane (2M) was added dropwise and slowly thereto. After the mixture was allowed to react at 25° C. with stirring for 0.5 hour, the mixture was heated to 70° C. and dried by allowing high purification nitrogen gas passing through the reactor;

(3) At ambient temperature, to the dried powders obtained from step (2) was added 100 ml of hexane, and to the mixture was added the alcohol-magnesium complex prepared in step (1) with stirring, then the reaction was heated to 50° C. and allowed to continue with stirring for further 1 hour;

(4) With stirring, to the reaction mixture obtained from step (3) was added dropwise and slowly 0.56 ml of titanium tetrachloride, then the reaction was continued at 50° C. for 1 hour, next the reaction mixture was heated to 70° C. and dried by allowing high purification nitrogen gas passing through the reactor to obtain solid powders.

The catalyst solid component was evaluated in slurry polymerization under the same polymerization conditions as that in Example 1, and the results of polymerization were shown in Table 1.

The amount of static charges carried by the catalyst solid component powders was evaluated through above-mentioned method, and the result was shown in Table 1.

COMPARATIVE EXAMPLE 2

A catalyst solid component was prepared through a procedure similar to that described in Comparative Example 1, except that butyl octyl magnesium used in step (1) was replaced with dibutyl magnesium.

The catalyst solid component was evaluated in slurry polymerization under the same polymerization conditions as that in Example 1, and the results of polymerization were shown in Table 1.

The amount of static charges carried by the catalyst solid component powders was evaluated through above-mentioned method, and the result was shown in Table 1.

EXAMPLE 5

A catalyst solid component was prepared by the steps of:
(1) About 500 g of spheric silica (XP02485 Grade, available from Grace Company, USA) was activated at 600° C. under nitrogen atmosphere for 4 hours, (2) Under nitrogen atmosphere, to a high temperature dried reactor equipped with a stirrer were successively charged with 224 g of heat activated silica obtained from step (1), 2500 ml of purified hexane and 78.4 ml of Al(C$_2$H$_5$)$_3$ solution in hexane (2.0 mmol/ml), and the mixture was stirred at ambient temperature for 45 minutes;

(3) At ambient temperature, to the reactor was added dropwise 53.0 ml of dibutyl magnesium solution in heptane (1 mmol/ml), and after the reaction (mixture was stirred for further 2 hours, it was placed overnight;

(4) While stirring and at ambient temperature, 67.2 ml of Cl$_3$CCH$_2$OH was added dropwise to the reactor, and then the reaction mixture was heated to 55° C. and stirred for further 1 hour;

(5) At 55° C., 28 ml of silicone tetrachloride was dropwise added thereto, upon completion, 34 ml of titanium tetrachloride was dropwise added, and then the reaction mixture was heated to 68° C. and stirred for further 2 hour, followed by being cooled to ambient temperature, next, the stirrer was stopped and supernatant was removed;

(6) 2000 ml of hexane was added thereto, and after stirring for 10 minutes, supernatant was removed;

(7) Step (6) was repeated for one time;

(8) The reaction mixture was heated to 70° C. and dried by allowing high purification nitrogen gas passing through the reactor to obtain free flowing brown solid powders.

The catalyst solid component was evaluated in slurry polymerization under the same polymerization conditions as that in Example 1, and the results of polymerization were shown in Table 1.

The amount of static charges carried by the catalyst solid component powders was evaluated through above-mentioned method, and the result was shown in Table 1.

EXAMPLE 6

A catalyst solid component was obtained by the steps of:

(1) About 12 g of spheric silica (XPO2485 Grade, from Grace Company, USA) was activated at 600° C. under nitrogen atmosphere for 4 hours;

(2) Under nitrogen atmosphere, to a high temperature dried glass reactor equipped with a stirrer were successively charged with 8.0 g of heat activated silica obtained from step (1), 100 ml of purified hexane and 2.8 ml of Al(C$_2$H$_5$)$_3$ solution in hexane (2.0 mmol/ml), and the mixture was stirred at ambient temperature for 30 minutes;

(3) At ambient temperature, to the reactor was added dropwise 19.0 ml of dibutyl magnesium solution in heptane (1 mmol/ml), and then the reaction mixture was stirred for further 1 hour;

(4) While stirring and at ambient temperature, 2.4 ml of Cl$_3$CCH$_2$OH was added dropwise to the reactor, and then the reaction mixture was heated to 55° C. and stirred for further 1 hour;

(5) At 55° C., 2.6 ml of CH$_3$CH$_2$CH$_2$CH$_2$Cl was dropwise added thereto, and after the reaction mixture was stirred for 1 hour, 1.2 ml of titanium tetrachloride was added dropwise, and then the reaction mixture was heated to 68° C. and stirred for further 1 hour, followed by being cooled to ambient temperature, next, the stirrer was stopped and supernatant was removed;

(6) 100 ml of hexane was added thereto, and after stirring for 10 minutes, supernatant was removed;

(7) Step (6) was repeated for one time;

(8) The reaction mixture was heated to 70° C. and dried by allowing high purification nitrogen gas passing through the reactor to obtain free flowing brown solid powders.

The catalyst solid component was evaluated in slurry polymerization under the same polymerization conditions as that in Example 1, and the results of polymerization were shown in Table 1.

The amount of static charges carried by the catalyst solid component powders was evaluated through above-mentioned method, and the result was shown in Table 1.

COMPARATIVE EXAMPLE 3

A catalyst solid component was obtained by the steps of:

(1) About 12 g of spheric silica (XPO2485 Grade, available from Grace Company, USA) was activated at 600° C. under nitrogen atmosphere for 4 hours;

(2) Under nitrogen atmosphere, to a high temperature dried glass reactor equipped with a stirrer were successively charged with 5.0 g of heat activated silica obtained from step (1), 100 ml of purified hexane and 1.5 ml of Al(C$_2$H$_5$)$_3$ solution in hexane (2.0 mmol/ml), and the mixture was stirred at ambient temperature for 30 minutes.

(3) At ambient temperature, to the reactor was added dropwise 10.0 ml of dibutyl magnesium solution in heptane (1 mmol/ml), and then the reaction mixture was stirred for further 1 hour;

(4) While stirring and at ambient temperature, 1.1 ml of CH$_3$CH$_2$OH was added dropwise to the reactor, and then the reaction mixture was heated to 55° C. and stirred for further 1 hour;

(5) At 55° C., 0.5 ml of silicone tetrachloride was dropwise added thereto, and after the reaction mixture was stirred for 1 hour, 0.6 ml of titanium tetrachloride was added dropwise, and then the reaction mixture was heated to 68° C. and stirred for further 1 hour, followed by being cooled to ambient temperature, then the stirrer was stopped and supernatant was removed;

(6) 100 ml of hexane was added thereto, and after stirring for 10 minutes, supernatant was removed;

(7) Step (6) was repeated for one time;

(8) The reaction mixture was heated to 70° C. and dried by allowing high purification nitrogen gas passing through the reactor to obtain free flowing light brown solid powders.

The catalyst solid component was evaluated in slurry polymerization under the same polymerization conditions as that in Example 1, and the results of polymerization were shown in Table 1.

The amount of static charges carried by the catalyst solid component powders was evaluated through above-mentioned method, and the result was shown in Table 1.

TABLE 1

| Catalyst component | Polymerization under low hydrogen partial pressure ($H_2/C_2^=$: 0.28/0.75) | | Polymerization under high hydrogen partial pressure ($H_2/C_2^=$: 0.60/0.43) | | Amount of static charges |
|---|---|---|---|---|---|
| | Activity (gPE/g cat) | MI g/10 min | Activity (gPE/g cat) | MI (g/10 min) | (amount of powders attached to the wall, g) |
| Example 1 | 4447 | 3.68 | 1750 | 58.5 | 0.32 |
| Example 2 | 2879 | 2.22 | 1260 | 48.8 | 0.44 |
| Example 3 | 4839 | 2.18 | 1686 | 41.1 | 0.47 |
| Example 4 | 3309 | 3.56 | 1100 | 67.9 | 0.16 |
| Example 5 | 3042 | 1.90 | 1450 | 53.4 | 0.21 |
| Example 6 | 3781 | 1.05 | 1947 | 33.9 | 0.19 |
| Comparative Example 1 | 2233 | 0.99 | 1035 | 42.6 | 1.50 |

TABLE 1-continued

| Catalyst component | Polymerization under low hydrogen partial pressure $H_2/C_2^-$: 0.28/0.75 | | Polymerization under high hydrogen partial pressure $(H_2/C_2^-$: 0.60/0.43) | | Amount of static charges (amount of powders attached to the wall, g) |
|---|---|---|---|---|---|
| | Activity (gPE/g cat) | MI g/10 min | Activity (gPE/g cat) | MI (g/10 min) | |
| Comparative Example 2 | 3428 | 2.35 | 1432 | 47.0 | 1.03 |
| Comparative Example 3 | 4352 | 0.43 | 4275 | 6.0 | 0.19 |

It can be seen from the results of Examples and Comparative Examples shown in Table 1 that besides that the catalysts according to the present invention have high polymerization activity and good hydrogen response, the amount of static charges carried by the catalyst solid component according to the invention is remarkably reduced. Thus it can be expected that anti-static agent added during industrial-scale operation of ethylene polymerization can be eliminated or reduced in amount.

Although the present invention has been described in connection with embodiments and examples, further modifications and alternative embodiments of various aspects of the invention will be apparent to those skilled in the art in view of this description. Accordingly, this description is to be constructed as illustrative only and is for the purpose of teaching the general manner of carrying out the invention. Additionally, all cited documents are wholly incorporated into this description by reference.

What is claimed is:

1. A catalyst component for ethylene polymerization, consisting of a reaction product of an inorganic oxide support, and at least one alkyl metal compound, at least one halide, at least one dihydrocarbyl magnesium compound, at least one difuntional compound that reacts with the dihydrocarbyl magnesium compound and at least one titanium compound, which are supported on the support, wherein (1) the alkyl metal compound is represented by formula (I):

$$M'R^1R^2R^3 \quad (I)$$

wherein $R^1$, $R^2$ and $R^3$, which are identical or different, are $C_1$–$C_{20}$ alkyl, M' is a metal Group 13 of the Periodic Table;

(2) the halide is a $C_1$–$C_{20}$ alkyl halide, or a compound represented by formula (II) $MX_n$, in which M is an element of Group 3, 4, 5, 13, 14 or 15 of the Periodic Table, X is F, Cl or Br, and n=3, 4 or 5; and (3) the difunctional compound is a mono-, di- or multi-halogenated alcohol or phenol having from 2 to 20 carbon atoms; or a mono-, di- or multi-halogenated acyl halide having from 2 to 20 carbon atoms.

2. The catalyst component for ethylene polymerization according to claim 1, wherein in the compound of formula (II), X is chloride.

3. The catalyst component for ethylene polymerization according to claim 2, wherein the compound of formula (II) is at least one selected from the group consisting of $AlCl_3$, $BCl_3$, $SiCl_4$, $TiCl_4$, $CCl_4$, $CH_3CH_2CH_2CH_2Cl$ and $(CH_3)_3CCl$.

4. The catalyst component for ethylene polymerization according to claim 1, wherein the difunctional compound is a mono-, di- or multi-halogenated alcohol or phenol having from 2 to 20 carbon atoms.

5. The catalyst component for ethylene polymerization according to claim 4, wherein the difunctional compound is at least one selected from the group consisting of $Cl_3CCH_2OH$, $Cl_2CHCH_2OH$, $ClCH_2CH_2OH$, $Cl_3CC(CH_3)_2OH$, $ClCH_2CH_2CH_2CH_2OH$, o-chlorophenol, m-chlorophenol, p-chlorophenol, and 2-chloro-cyclohexanol.

6. The catalyst component for ethylene polymerization according to claim 1, wherein the difunctional compound is a mono-, di- or multi-halogenated acid halide having from 2 to 20 carbon atoms.

7. The catalyst component for ethylene polymerization according to claim 6, wherein the difunctional compound is at least one selected from the group consisting of $Cl_3CCOCl$, $Cl_2CHCOCl$, $ClCH_2COCl$, and o-chlorobenzoyl chloride.

8. The catalyst component for ethylene polymerization according to claim 1, wherein the dihydrocarbyl magnesium compound is represented by formula (IV):

$$MgR^6R^7 \quad (IV)$$

in which $R^6$ and $R^7$, which are identical or different, are $C_2$–$C_{20}$ hydrocarbyl.

9. The catalyst component for ethylene polymerization according to claim 8, wherein in the dihydrocarbyl magnesium compound of formula (IV), $R^6$ and $R^7$, which are identical or different, are $C_2$–$C_{12}$ alkyl.

10. The catalyst component for ethylene polymerization according to claim 1, wherein the titanium compound is represented by formula (V):

$$Ti(OR^8)_{4-m}X_m \quad (V)$$

in which $R^8$ is a $C_1$–$C_{14}$ linear or branched aliphatic hydrocarbyl, X is selected from the group consisting of F, Cl, Br, and mixtures thereof, and m is an integer of from 1 to 4.

11. The catalyst component for ethylene polymerization according to claim 10, wherein the titanium compound of formula (V) is titanium tetrachloride.

12. The catalyst component for ethylene polymerization according to claim 1, wherein the inorganic oxide support is at least one selected from the group consisting of silica, alumina, silica-alumina, magnesia, titania, chromia, and zirconia.

13. A process for the preparation of the catalyst component for ethylene polymerization according to claim 1, comprising the steps of:

(1) contacting an inorganic oxide support with an alkyl metal compound having formula:

$$M'R^1R^2R^3 \quad (I)$$

in which $R^1$, $R^2$ and $R^3$, which are identical or different, are $C_1$–$C_{20}$ alkyl, M' is a metal of Group 13 of the Periodic Table, to obtain a treated inorganic oxide support;

(2) contacting the treated inorganic oxide support obtained from the step (1) with a dihydrocarbyl magnesium compound;

(3) contacting the product obtained from the step (2) with a difunctional compound, which is a mono-, di- or multi-halogenated alcohol or phenol having from 2 to 20 carbon atoms, or a mono-, di- or multi-halogenated acyl halide having from 2 to 20 carbon atoms;

(4) contacting the product obtained from the step (3) with a halide, which is a $C_1$–$C_{20}$ alkyl halide, or a compound represented by formula (II) $MX_n$, in which M is an element of Group 3, 4, 5, 13, 14 or 15 of the Periodic Table, X is F, Cl or Br, and n=3, 4 or 5; and (5) contacting the product obtained from the step (4) with a titanium compound to obtain a catalyst component.

14. The process according to claim 13, wherein the amount of the compound of formula (I) used is from 0.1 to 5.0 mmol; the amount of the halide used is from 0.1 to 5.0 mmol, the amount of the difunctional compound used is from 0.2 to 10 mmol, the amount of dihydrocarbyl magnesium compound used is from 0.25 to 5.0 mmol, and the amount of the titanium compound used is from 0.1 to 5.0 mmol, with respect to 1 gram of the inorganic oxide support; and wherein the molar ratio of the difunctional compound to the dihydrocarbyl magnesium compound is controlled to a range of 0.8 to 2.5.

15. A catalyst for ethylene polymerization, comprising:
(a) the catalyst component for ethylene polymerization according to claim 1; and
(b) at least one organoaluminium compound of formula $AlR_nX_{3-n}$, wherein R are independently hydrogen or hydrocarbyl having from 1 to 20 carbon atoms, X are independently of each other halogen, and n is an integer meeting the condition of $1<n\leq3$.

16. A process for ethylene polymerization, comprising the steps of (a) providing the catalyst of claim 15, and (b) contacting ethylene and optionally a comonomer or comonomers with the catalyst under polymerization conditions.

17. A process for the preparation of the catalyst component for ethylene polymerization according to claim 13, wherein in the compound of formula II, X is chloride.

18. A process for the preparation of the catalyst component for ethylene polymerization according to claim 13, wherein the compound of formula (II) is at least one selected from the group cosisting of $AlCl_3$, $BCl_3$, $SiCl_4$, $TiCl_4$, $CCl_4$, $CH_3CH_2CH_2CH_2Cl$ and $(CH_3)_3CCl$.

19. A catalyst which consists of the catalyst component according to claim 1 and at least one organoaluminum compound.

20. A process for the preparation of the catalyst component for ethylene polymerization according to claim 13, wherein the difunctional compound is at least one selected from the group consisting of $Cl_3CCH_2OH$, $Cl_2CHCH_2OH$, $ClCH_2CH_2OH$, $Cl_3CC(CH_3)_2OH$, $ClCH_2CH_2CH_2CH_2OH$, o-chlorophenol, m-chlorophenol, p-chlorophenol, 2-chloro-cyclohexanol, $Cl_3CCOCl$, $Cl_2CHCOCl$, $ClCH_2COCl$, and o-chlorobenzoyl chloride.

21. A catalyst component for ethylene polymerization, consisting of a reaction product of an inorganic oxide support, and at least one alkyl metal compound, at least one halide, at least one dihydrocarbyl magnesium compound, at least one difunctional compound that reacts with the dihydrocarbyl magnesium compound and at least one titanium compound, which are supported on the support, said catalyst component being obtained by a process comprising the steps of:

(1) contacting the inorganic oxide support with an alkyl metal compound having formula:

$$M'R^1R^2R^3 \quad (I)$$

in which $R^1$, $R^2$ and $R^3$, which are identical or different, are $C_1$–$C_{20}$ alkyl, M' is a metal of Group 13 of the Periodic Table, to obtain a treated inorganic oxide support;

(2) contacting the treated inorganic oxide support obtained from the step (1) with the dihydrocarbyl magnesium compound;

(3) contacting the product obtained from the step (2) with the difunctional compound, which is a mono-, di- or multi-halogenated alcohol or phenol having from 2 to 20 carbon atoms, or a mono-, di- or multi-halogenated acyl halide having from 2 to 20 carbon atoms;

(4) contacting the product obtained from the step (3) with a halide, which is a $C_1$–$C_{20}$ alkyl halide or a compound represented by formula (II) $MX_n$, in which M is an element of Group 3, 4, 5, 13, 14 or 15 of the Periodic Table, X is F, Cl or Br, and n=3, 4 or 5; and (5) contacting the product obtained from the step (4) with the titanium compound to obtain the catalyst component.

22. The catalyst component according to claim 21,
wherein the compound of formula (II) is at least one selected from the group consisting of $AlCl_3$, $BCl_3$, $SiCl_4$, $TiCl_4$, $NdCl_2$, $CCl_4$, $CH_3CH_2CH_2CH_2Cl$ and $(CH_3)_3CCl$;

wherein the difunctional compound is at least one selected from the group consisting of $Cl_3CCH_2OH$, $Cl_2CHCH_2OH$, $ClCH_2CH_2OH$, $Cl_3CC(CH_3)_2OH$, $ClCH_2CH_2CH_2CH_2OH$, o-chlorophenol, m-chlorophenol, p-chlorophenol, 2-chloro-cyclohexanol, $Cl_3CCOCl$, $Cl_2CHCOCl$, $ClCH_2COCl$, and o-chlorobenzoyl chloride;

wherein the dihydrocarbyl magnesium compound is represented by formula (IV):

$$MgR^6R^7 \quad (IV)$$

in which $R^6$ and $R^7$, which are identical or different, are $C_2$-$C_{20}$ hydrocarbyl;

wherein the titanium compound is represented by formula (V):

$$Ti(OR^8)_{4-m}X_m \quad (V)$$

in which $R^8$ is a $C_1$–$C_{14}$ linear or branched aliphatic hydrocarbyl, X is selected from the group consisting of F, Cl, Br, and mixtures thereof, and m is an integer of from 1 to 4; and wherein the inorganic oxide support is at least one selected from the group consisting of silica, alumina, silica-alumina, magnesia, titania, chromia, and zirconia.

* * * * *